(12) United States Patent
Distler et al.

(10) Patent No.: US 8,604,921 B2
(45) Date of Patent: Dec. 10, 2013

(54) METHOD FOR DISPLAYING INFORMATION

(75) Inventors: Armin Distler, Munich (DE); Hermann Kuenzner, Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 860 days.

(21) Appl. No.: 12/766,299

(22) Filed: Apr. 23, 2010

(65) Prior Publication Data
US 2010/0207748 A1 Aug. 19, 2010

Related U.S. Application Data

(63) Continuation of application No. PCT/EP2008/008748, filed on Oct. 16, 2008.

(30) Foreign Application Priority Data

Oct. 25, 2007 (DE) .......................... 10 2007 051 010

(51) Int. Cl.
*B60Q 1/00* (2006.01)
(52) U.S. Cl.
USPC ............ 340/461; 345/156; 345/173; 715/815
(58) Field of Classification Search
USPC ............... 340/461, 425.5; 345/156, 173, 661, 345/169; 715/65, 815; 725/45
See application file for complete search history.

(56) References Cited

U.S. PATENT DOCUMENTS

| | | | |
|---|---|---|---|
| 5,736,974 A | 4/1998 | Selker | |
| 6,373,472 B1 * | 4/2002 | Palalau et al. | ................. 345/173 |
| 2002/0093539 A1 | 7/2002 | Os et al. | |
| 2006/0036335 A1 * | 2/2006 | Banter et al. | ................... 700/17 |
| 2006/0048184 A1 * | 3/2006 | Poslinski et al. | ................ 725/45 |
| 2006/0261965 A1 | 11/2006 | Cieler et al. | |

(Continued)

FOREIGN PATENT DOCUMENTS

| | | |
|---|---|---|
| DE | 102 37 725 A1 | 2/2004 |
| DE | 103 60 655 A1 | 7/2005 |

(Continued)

OTHER PUBLICATIONS

German Search Report dated Dec. 5, 2011 including partial English-language translation (Ten (10) pages).

(Continued)

*Primary Examiner* — Brent Swarthout
(74) *Attorney, Agent, or Firm* — Crowell & Moring LLP

(57) ABSTRACT

In a method for displaying information relating to the assignments of functions to a group of freely assignable operating keys in a motor vehicle, a first display step outputs for each operating key of the group a brief description of the respective function assignment, and a second display step outputs for a single selected operating key of the group a more detailed description. In the first display step, the brief descriptions of all operating keys of the group are output side-by-side into screen areas, which essentially are adjacent to each other, in an edge region of a display unit of the motor vehicle. In the second display step, the more detailed description is output into the same edge region of the same display unit such that the more detailed description covers the entire screen area of the brief description of the selected operating key, and the more detailed description at least partially covers the screen area of the brief description of at least one additional operating key.

12 Claims, 5 Drawing Sheets

(56) References Cited

U.S. PATENT DOCUMENTS

| | | |
|---|---|---|
| 2007/0242050 A1 | 10/2007 | Kuenzner et al. |
| 2007/0256027 A1 | 11/2007 | Daude |
| 2008/0221747 A1 | 9/2008 | Baumann et al. |
| 2010/0156807 A1* | 6/2010 | Stallings et al. .............. 345/173 |
| 2010/0156815 A1* | 6/2010 | Silberman et al. ............ 345/173 |

FOREIGN PATENT DOCUMENTS

| | | |
|---|---|---|
| DE | 103 60 657 A1 | 7/2005 |
| DE | 10 2004 058 954 A1 | 6/2006 |
| DE | 10 2005 019 871 B3 | 9/2006 |
| DE | 10 2006 037 155 A1 | 10/2007 |
| EP | 1 083 078 A2 | 3/2001 |
| EP | 1 195 673 A1 | 4/2002 |
| WO | WO 2006/003588 A2 | 1/2006 |

OTHER PUBLICATIONS

International Search Report dated Jan. 23, 2009 including English-language translation (Four (4) pages).

\* cited by examiner

METHOD FOR DISPLAYING INFORMATION

CROSS-REFERENCE TO RELATED APPLICATIONS

This application is a continuation of PCT International Application No. PCT/EP2008/008748, filed Oct. 16, 2008, which claims priority under 35 U.S.C. §119 from German Patent Application No. DE 10 2007 051 010.3, filed Oct. 25, 2007, the entire disclosures of which are herein expressly incorporated by reference.

BACKGROUND AND SUMMARY OF THE INVENTION

The invention relates to a method for displaying information relating to the assignments of functions to a group of freely assignable operating keys in a motor vehicle. According to this method, a first display step outputs for each operating key of the group a brief description of the respective function assignment, and a second display step outputs for a single selected operating key of the group a more detailed description. Such a method is known, for example, from DE 10 2004 058 954 A1.

For reasons relating to energy and economic efficiency, as well as for design reasons, only relatively small displays are generally installed in motor vehicles. Therefore, the efficient use of the available display area is especially important.

The object of the invention is to improve the utilization of the available display area in a motor vehicle in using a method of the type described above.

This object is achieved with a method for displaying information relating to the assignments of functions to a group of freely assignable operating keys in a motor vehicle, where, according to this method, a first display step outputs for each operating key of the group a brief description of the respective function assignment, and where a second display step outputs for a single selected operating key of the group a more detailed description. In the first display step, the brief descriptions of all operating keys of the group are output side-by-side into screen areas, which in essence are adjacent to each other, in an edge region of a display unit of the motor vehicle. In the second display step, the more detailed description is output into the same edge region of the same display unit in such a manner that the more detailed description covers the entire screen area of the brief description of the selected operating key, and the more detailed description at least partially covers the screen area of the brief description of at least one additional operating key. Advantageous embodiments and further developments of the invention are described herein.

The invention makes it possible to display the more detailed information at least partially in screen areas, to which brief descriptions had already been assigned before and that are only rarely the focus of the user's attention in any event because they are located on the edge of the display. The brief description of the selected operating key becomes obsolete due to the long description. Therefore, its screen area can be released at least partially to the benefit of the long description. Even the brief description of other operating keys is normally regarded as obsolete or at least less relevant when the operator has already reached the second display step for the selected operating key. Therefore, the screen areas of the brief descriptions of other operating keys can also be released at least partially to the benefit of the long description of the selected operating key.

Preferably, in the second display step, the more detailed description covers exclusively the display area that was used for brief descriptions in the first display step. Hence, no additional display area is required.

Preferably, in the second display step, the more detailed description even covers the entire display area that was used for brief descriptions in the first display step. As a result, this display area is utilized especially well.

Preferably, in the second display step, the more detailed description covers exactly the display area that was used for the whole set of brief descriptions in the first display step.

According to a first preferred embodiment of the invention, the screen areas of the brief descriptions in the first display step have essentially the same height and are arranged side by side on the display area at the same height such that they form essentially a line. In the second display step the more detailed description covers a portion of this line that is enhanced with respect to the brief description of the selected operating key, or it even covers the entire line. The line is located preferably at the upper or lower edge of the display unit.

According to a second preferred embodiment of the invention, the screen areas of the brief descriptions in the first display step have essentially the same width and are arranged one above the other so as to be horizontally oriented in relation to each other such that they form essentially a column. In the second display step the more detailed description covers a portion of this column that is enhanced with respect to the brief description of the selected operating key, or it even covers the entire column. The column is located preferably on the left or the right edge of the display unit.

Preferably, in the second display step, the brief description of at least one non-selected operating key is scaled down with respect to the first display step to the benefit of the more detailed description of the selected operating key.

In addition, it is preferred that in the second display step the brief description of at least one non-selected operating key is shifted with respect to the first display step inside the display area that had already been used in the first display step for brief descriptions. Owing to the combination of scaling down and shifting, the brief descriptions of the other operating keys can yield somewhat to the benefit of the description of the selected key that becomes more detailed in the second display step. Nevertheless, a three dimensional correspondence between the spatial arrangement of the operating keys and the respective brief descriptions and/or the more detailed description can be maintained.

As an alternative, in the second display step the brief description of at least one non-selected operating key can be at least partially covered by the more detailed description of the selected operating key.

Other objects, advantages and novel features of the present invention will become apparent from the following detailed description of one or more preferred embodiments when considered in conjunction with the accompanying drawings.

DETAILED DESCRIPTION OF THE DRAWINGS

In order to operate menu systems in motor vehicles, the trend is to use variably assignable operating keys, also referred to as "soft" keys or "favorite" keys. In this context, the respective function of the operating keys in their current state of assignment can usually be shown on a display, for example a screen disposed in the interior of the vehicle. For this purpose, small fields with key descriptions are depicted on the display. Basically these fields can be displayed permanently or temporarily.

It is advantageous if in a state, in which the key description fields are being shown on the display, the spatial arrangement of the operating keys corresponds with the spatial arrangement of the key description fields. For example, some systems arrange the operating keys in the immediate vicinity of the display, and the key description, which matches the respective operating key, is located directly adjacent to, above, or below the operating key on the display.

Figure 1:
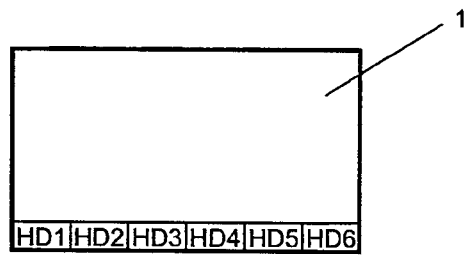
FIG. 1 depicts a corresponding arrangement of horizontally distributed operating keys and the respective key descriptions on a display unit of a motor vehicle.

FIG. 1 shows such a corresponding spatial arrangement of the operating keys HT1, HT2, HT3, HT4, HT5, HT6, which are distributed spatially in a horizontal manner, and the matching key descriptions HD1, HD2, HD3, HD4, HD5, HD6 on a display 1 of a motor vehicle.

Figure 2:
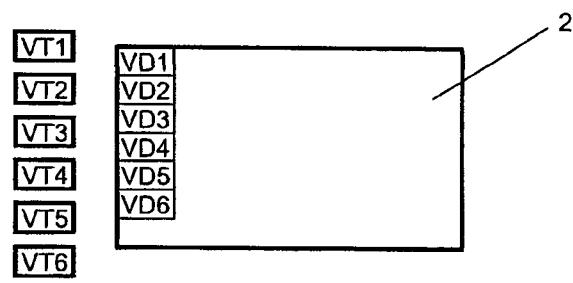
FIG. 2 depicts a corresponding arrangement of vertically distributed operating keys and the respective key descriptions on a display unit of a motor vehicle.

FIG. 2 shows such a corresponding spatial arrangement of the operating keys VT1, VT2, VT3, VT4, VT5, VT6, which are distributed spatially in a vertical manner, and the matching key descriptions VD1, VD2, VD3, VD4, VD5, VD6 on a display 1 of a motor vehicle.

Thus, the lettering and/or any other form of description of the operating keys is carried out spatially so as to correspond to their spatial arrangement. If the operating keys HD, VD are arranged so as to lie side-by-side, then the brief descriptions are also arranged side-by-side. If the operating keys are arranged one above the other, then the brief descriptions are also arranged one above the other. The same applies to any other potential key arrangements (for example, circular, semi-circular, sloping, etc.).

For reasons relating to energy and economic efficiency, as well as for design reasons, only relatively small displays are generally installed in motor vehicles. In the case of an arrangement according to FIG. 1 or FIG. 2, the spatial restrictions on such a display allow only a relatively brief textual description of each key function. It is often the case that only symbols are used to describe the key functions.

In addition, if the operating keys are arranged at a greater distance from the display, an unskilled operator will find it increasingly difficult to form a relationship between the operating keys and the key description of the same that appears on the display.

Preferably, the description of the key function is carried out in multiple steps as a consequence of request operations performed by the operator. The individual steps of the key description can be selected by a variety of methods.

In a first exemplary system, corresponding to the system according to FIG. 1, the display 1 does not show any of the key description fields in FIG. 1 prior to one of the operating keys being touched.

A first step of the key description of a specific operating key can be triggered by a touch of this operating key. Thus, when the operator touches the operating key, that action constitutes a first request operation.

Figure 3:
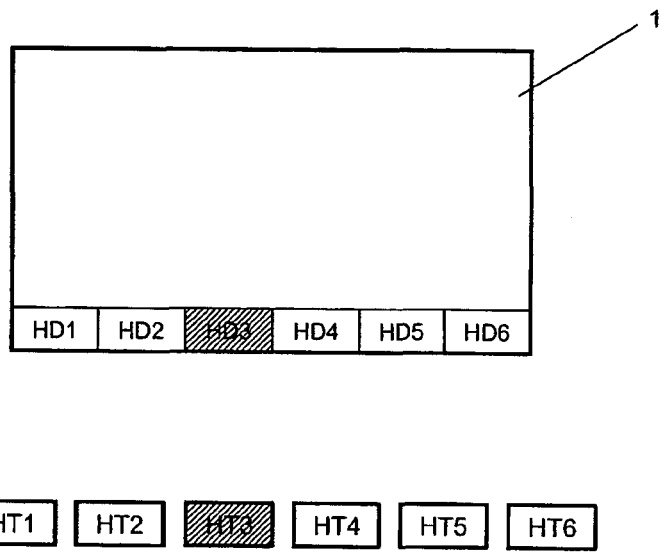
FIG. 3 depicts an accentuation or highlighting of the key description of a single operating key in the device according to FIG. 1.

FIG. 3 shows the display 1 just after the operator touches the operating key HT3. In FIG. 3, the touch of the operating key HT3 is indicated by a shading of the operating key HT3 (shown in the figure as cross-hatching from the left bottom to the right top). The first step of the key description includes a brief textual description of the key function in the corresponding key description field HD3 on the display 1. In addition, the first step includes an identification of the operating key that has been touched. This identification is activated by visually accentuating or highlighting in some manner the key description field, matching the operating key, on the display 1, for example, by coloring in the key description field HD3. In FIG. 3, the coloring is also represented by a cross-hatch shading of the key description field HD3 from the left bottom to the right top. The accentuation of the key description field HD3 is perceived by the operator intuitively as the identifier of the operating key HT3, last but not least due to the corresponding arrangement of the key description fields and the operating keys.

In the first step of the key description, the key description fields HD1, HD2, HD4, HD5, HD6 of all of the other operating keys HT1, HT2, HT4, HT5, HT6 also pop up on the display 1 substantially simultaneously with the key description of the operating key HT3 that was touched. However, these other key description fields HD1, HD2, HD4, HD5, HD6 are not visually accentuated. Therefore, the operator perceives only the operating key HT3, which he has touched, as identified.

This identification of the touched operating key allows the operator to correct his finger position, if the "correct" or rather desired operating key was not touched. In particular, in systems in which the operating keys are located at a certain distance from the display, the keys are significantly easier to operate.

Figure 7:
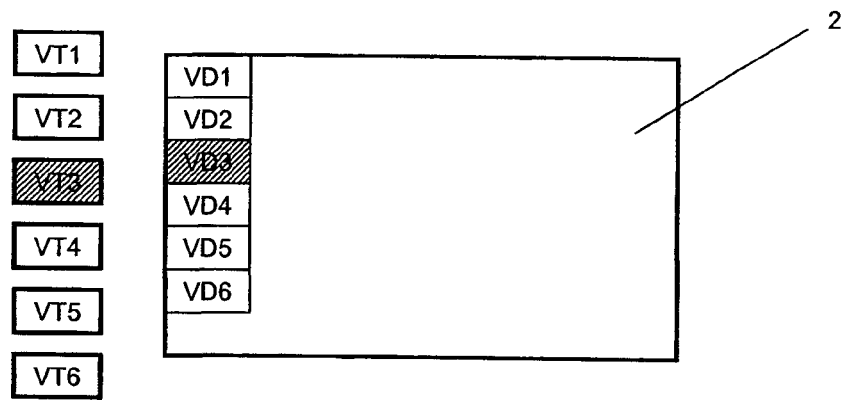
FIG. 7 depicts an accentuation or highlighting of the key description of a single operating key in the device according to FIG. 2.

FIG. 7 shows a screen view of a first step of the key description at the touch of the operating key VT3 for the case of a vertical spatial arrangement of the operating keys. A second step of the key description is triggered, when the duration of touching HT3 or VT3 exceeds a defined time threshold (for example, 2 seconds). Thus, if the operator touches the operating key for a prolonged period of time, this action constitutes a second request operation.

Figure 4:
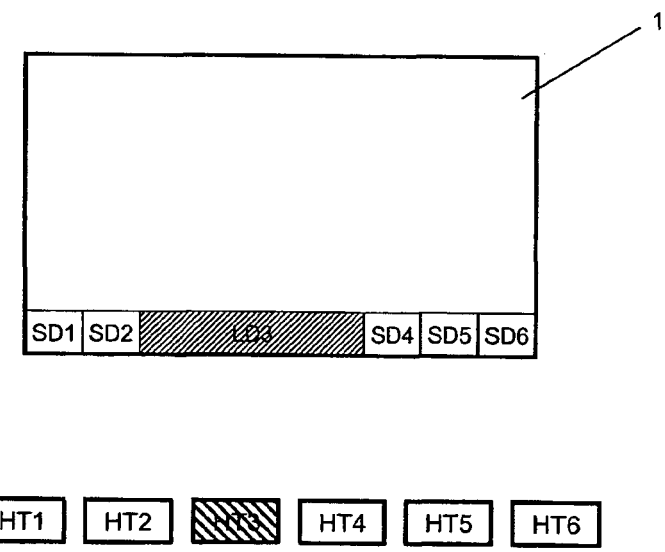
FIG. 4 depicts a long description of a single operating key in the device according to FIG. 1.

FIG. 4 shows the display 1 just after the time threshold has been exceeded. In FIG. 4, the prolonged touch of the operating key HT3 is represented by a shading of the operating key HT3 from the left top to the right bottom. The second step of the key description includes a long description of the key function, this long description being more detailed compared to the previous brief description, in the key description field LD3 that is enlarged now compared to the key description field HD3. If desired, the more detailed brief description can also include a symbol, for example, a musical note, if the operating key HT3 is assigned a radio station. The more detailed key description field LD3 is also visually accentuated. Furthermore, simultaneously with the key description LD3 of the touched operating key HT3 the key description fields SD1, SD2, SD4, SD5, SD6 of all of the other operating keys HT1, HT2, HT4, HT5, HT6 are also displayed on the display 1. However, at this point these other key description fields SD1, SD2, SD4, SD5, SD6 are scaled down compared to the state HD1, HD2, HD4, HD5, HD6 of the first step according to FIG. 3, in order to provide the key description field LD3 with more display area. As an alternative, in an additional implementation the adjacent key description fields could also be simply covered totally or partially by LD3.

If the second step is triggered, then the long description of an operating key is displayed on a section of the display area that had already been used previously (in the first step) in part for at least one portion of the brief description of the same operating key. In this way the operator can follow with ease the transition from the first to the second step without losing the conceptual relationship between the operating key, first step and second step. Preferably, the whole screen area that had been used previously for the brief description of the same operating key is used for the long description of the operating key. Then the assignment is especially easy, because the transition from the brief description to the long description is shown to the operator visually as merely an "enlargement" of the key description. A comparison of FIG. 3 and FIG. 4 shows that LD3 covers the entire display area that was used previously for HD3. This is also the case when the display in the second step shows a more detailed long description ELD3 according to FIG. 5 that covers even more screen area.

Similarly it is advantageous if the long description of the operating key that is touched for a prolonged period of time is displayed on a section of the display area that had already been used previously (in the first step) at least partially for at least one portion of the brief description of at least another operating key. Therefore, at least within the scope of the display area, which had already been used previously for the brief description of at least another operating key, the long description does not give rise to an increased demand for display space. A comparison of FIG. 3 and FIG. 4 shows that LD3 covers a section of the display area that had been used previously for HD2 and HD4. This is also the case when the display in the second step shows a more detailed long description ELD3 according to FIG. 5 that covers even more screen area.

It is especially advantageous if the long description of the operating key that is touched for a prolonged period of time is displayed even exclusively on a section of the display area that had already been used previously (in the first step) for the brief descriptions. Then no additional display area is required at all for the long description. This is also the case during the transition from FIG. 3 to FIG. 4. LD3 covers exclusively the display area that had been used previously for HD2, HD3 and HD4.

Figure 6:
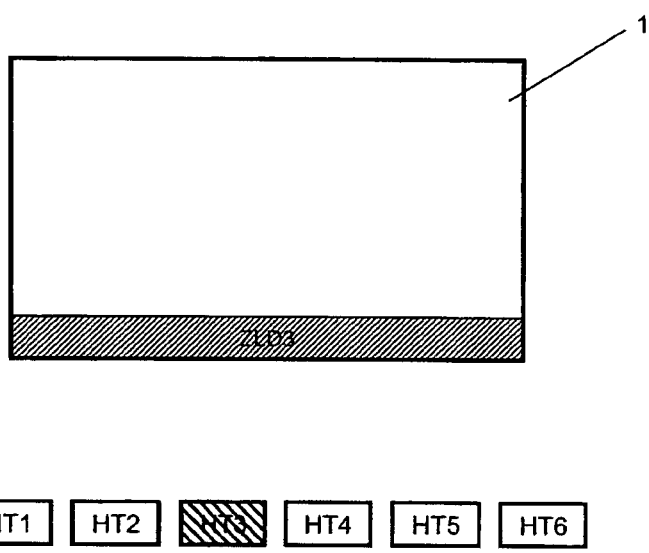
FIG. 6 depicts an additional embodiment of a long description in a device with a horizontal operating key distribution.

On the other hand, it is especially advantageous if the long description of the operating key that is touched for a prolonged period of time requires in its entirety that section of the display area that had already been used previously (in the first step) for the brief descriptions, that is, when the long description of the operating key that is touched for a prolonged period of time is displayed on exactly that section of the display area that had been used previously (in the first step) for the entire set of displayed brief descriptions. Then no additional display area is required at all for the long description, and yet a relatively large display area is available for displaying the long description. FIG. 6 shows a screen view, in which the line-shaped long description ZLD3 of the operating key HT3 that is depressed for a long period of time covers the entire horizontal screen line that had been used previously (cf. FIG. 3) for the brief descriptions of all of the operating keys.

Figure 8:
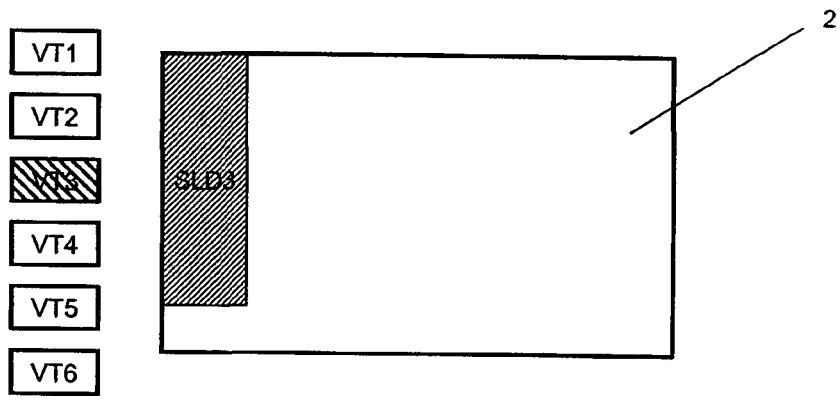
FIG. 8 depicts a long description of a single operating key in the device according to FIG. 2.

FIG. 8 shows a screen view, in which the column-shaped long description SLD3 of the operating key HT3 that is depressed for a long period of time covers the entire vertical screen column that had been used previously (cf. FIG. 7) for the brief descriptions of all of the operating keys.

Figure 5:
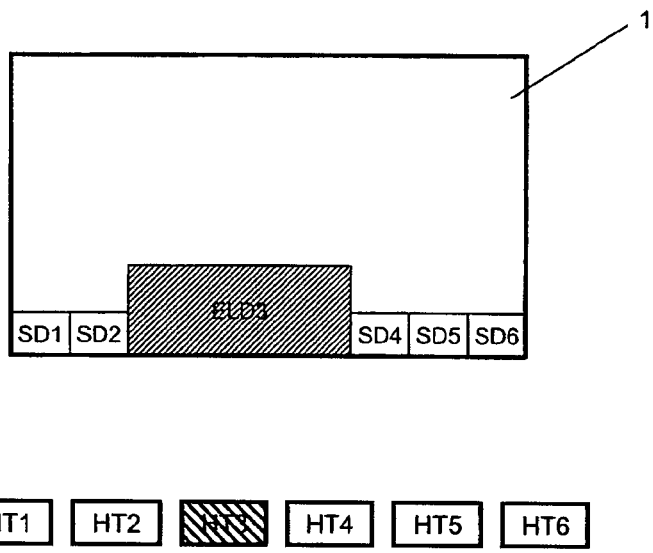
FIG. 5 depicts another embodiment of a long description in a device with a horizontal operating key distribution.
Figure 9:
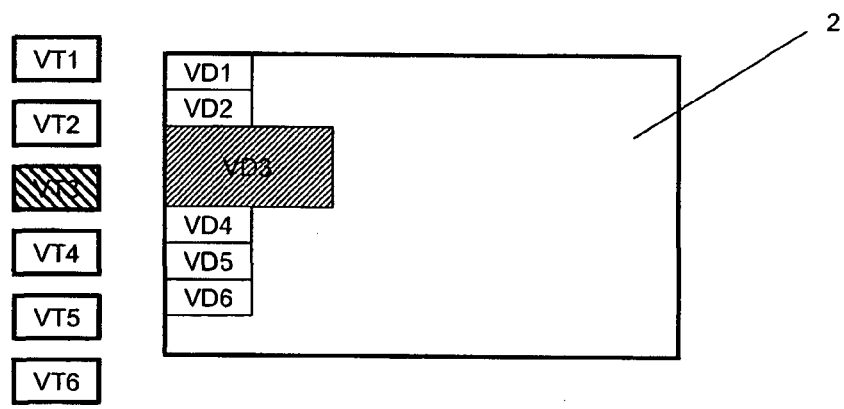
FIG. 9 depicts an additional embodiment of a long description in a device with a vertical operating key distribution.

It is self-evident that the long description can also extend optionally into screen areas that had not been used previously for a brief description, cf. FIG. 5 for the case of the horizontal operating key arrangement and FIG. 9 for the case of the vertical operating key arrangement.

The suitable function, which is assigned to the operating key HT3, is triggered by depressing the operating key HT3.

In a second exemplary system, the various steps of the key description of an operating key are triggered by depressing the operating key multiple times. A first key stroke results in a display of a brief description and identification of the depressed operating key. Then the display corresponds, for example, to that according to FIG. 3 or FIG. 7. A second key stroke results in a display of a more detailed long description and identification of the depressed operating key. Then the display corresponds, for example, to that according to FIG. 4, FIG. 5, FIG. 6, FIG. 8 or FIG. 9.

Preferably, in this second exemplary system, the second key stroke is rated as a second key stroke only if it occurs within a defined timespan (for example, 3 seconds) after the first key stroke. If the timespan is exceeded, then the brief description vanishes from the display, and the first subsequent key stroke of the operating key is rated again as the first key stroke. If in the interim another operating key was depressed, then the brief description of the operating key that was depressed first remains visible, but a subsequent key stroke of the operating key that was depressed first will still be rated again as the first key stroke, because now the other operating key is identified.

A third key stroke results in the triggering of the function, assigned to the respective operating key.

Preferably, in this second exemplary system, a key stroke is rated as a third key stroke, only if it occurs within a defined timespan (for example, 3 seconds) after the second key stroke. If the timespan is exceeded or another operating key was depressed in the interim, then the long description vanishes from the display, and the first subsequent key stroke of the operating key will be rated again as the first key stroke.

It is self-evident that the described method for identifying an operating key that was touched or previously selected elsewhere by accentuating the matching brief description can also be applied advantageously in a one step method for describing keys (for example, with just the brief description and without the long description).

With the invention it becomes possible to output, in a very space saving manner and completely (or at least largely) without covering any additional display areas, content information relating to the assignment and/or function of operating keys in various degrees of detail. In this case, the operating keys can also be arranged at a distance from the screen, because a good orientation is guaranteed by identifying the selected key by accentuating the matching brief description on the screen.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for displaying information relating to assignments of functions to a group of freely assignable operating keys in a motor vehicle, the method comprising the acts of:

in the first display step, brief descriptions of each respective function assignment for all operating keys of the group are output side-by-side into screen areas, which essentially are adjacent to each other, in an edge region of a display unit of the motor vehicle; and in the second display step, for a selected one of the operating keys, a more detailed description of the respective function assignment for the selected operating key is output into the same edge region of the same display unit such that the more detailed description covers an entire screen area of the brief description of the selected operating key, and the more detailed description at least partially covers a screen area of the brief description of at least one additional operating key, wherein the brief description and the more detailed description both correspond to the same operating key and correspondingly assigned function, and wherein the operating keys are arranged separately from a display in the motor vehicle on which the brief description and the more detailed description are displayed.

2. The method according to claim 1, wherein in the second display step the more detailed description covers exclusively the display area that was used for brief descriptions in the first display step.

3. The method according to claim 1, wherein in the second display step the more detailed description covers the entire display area that was used for brief descriptions in the first display step.

4. The method according to claim 2, wherein in the second display step the more detailed description covers the entire display area that was used for brief descriptions in the first display step.

5. The method according to claim 1, wherein in the second display step the more detailed description covers exactly that display area that was used for the entire set of brief descriptions in the first display step.

6. The method according to claim 1, wherein:
screen areas of the brief descriptions in the first display step have essentially the same height and are arranged side-by-side such that they form essentially a horizontal line; and in the second display step, the more detailed description covers a section of said horizontal line that is enhanced with respect to the brief description of the selected operating key.

7. The method according to claim 6, wherein in the second display step the more detailed description covers the entire line.

8. The method according to claim 1, wherein:
screen areas of the brief descriptions in the first display step have essentially the same width and are arranged one above the other such that they form essentially a vertical column; and in the second display step, the more detailed description covers a portion of said vertical column that is enhanced with respect to the brief description of the selected operating key.

9. The method according to claim 1, wherein in the second display step, the brief description of at least one non-selected operating key is scaled down with respect to the first display step to benefit the more detailed description of the selected operating key.

10. The method according to claim 2, wherein in the second display step, the brief description of at least one non-selected operating key is scaled down with respect to the first display step to benefit the more detailed description of the selected operating key.

11. The method according to claim 9, wherein in the second display step, the brief description of at least one non-selected operating key is shifted with respect to the first display step inside the display area that had already been used in the first display step for brief descriptions.

12. The method according to claim 1, wherein in the second display step, the brief description of at least one non-selected operating key is at least partially covered by the more detailed description of the selected operating key.

* * * * *